(12) United States Patent
Nakayama et al.

(10) Patent No.: US 8,993,178 B2
(45) Date of Patent: Mar. 31, 2015

(54) MAGNESIUM ION-CONTAINING NONAQUEOUS ELECTROLYTIC SOLUTION AND METHOD FOR MANUFACTURING THE SAME, AND ELECTROCHEMICAL DEVICE

(75) Inventors: Yuri Nakayama, Kanagawa (JP); Kenta Yamamoto, Kanagawa (JP); Yoshihiro Kudo, Tokyo (JP); Hideki Oki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1197 days.

(21) Appl. No.: 12/452,503

(22) PCT Filed: Jun. 5, 2008

(86) PCT No.: PCT/JP2008/060344
§ 371 (c)(1),
(2), (4) Date: Jan. 5, 2010

(87) PCT Pub. No.: WO2009/008232
PCT Pub. Date: Jan. 15, 2009

(65) Prior Publication Data
US 2010/0136438 A1 Jun. 3, 2010

(30) Foreign Application Priority Data
Jul. 11, 2007 (JP) .................................. 2007-182495

(51) Int. Cl.
*H01M 6/16* (2006.01)
*H01M 2/16* (2006.01)
(Continued)

(52) U.S. Cl.
CPC ........ *H01M 10/054* (2013.01); *H01M 10/0568* (2013.01); *H01M 10/0569* (2013.01); *H01M 4/466* (2013.01); *H01M 2300/0025* (2013.01)
USPC ........... 429/339; 429/324; 429/249; 429/248; 429/247; 429/188; 429/122

(58) Field of Classification Search
USPC .......... 429/339, 324, 188, 122, 247, 248, 249
See application file for complete search history.

(56) References Cited

U.S. PATENT DOCUMENTS 2,464,685 A * 3/1949 Hirsch ....................... 260/665 G
4,894,302 A 1/1990 Hoffman et al.
(Continued)

FOREIGN PATENT DOCUMENTS

EP 1058330 A1 12/2000
JP 2003-100347 A 4/2003
(Continued)

OTHER PUBLICATIONS

Macomber Organic Chemistry {vol. 21996 University Science Books Sausilito CA USA}.pdf.*
(Continued)

*Primary Examiner* — Patrick Ryan
*Assistant Examiner* — Aaron Greso
(74) *Attorney, Agent, or Firm* — Wolf, Greenfield & Sacks, P.C.

(57) ABSTRACT

A magnesium battery (10) is constituted of a negative electrode (1), a positive electrode (2) and an electrolyte (3). The negative electrode (1) is formed of metallic magnesium and can also be formed of an alloy. The positive electrode (2) is composed of a positive electrode active material, for example, a metal oxide, graphite fluoride $((CF)_n)$ or the like, etc. The electrolytic solution (3) is, for example, a magnesium ion-containing nonaqueous electrolytic solution prepared by dissolving magnesium(II) chloride $(MgCl_2)$ and dimethylaluminum chloride $((CH_3)_2AlCl)$ in tetrahydrofuran (THF). In the case of dissolving and depositing magnesium by using this electrolytic solution, the following reaction proceeds in the normal direction or reverse direction.

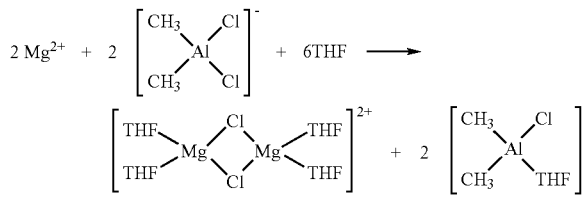

According to this, there are provided a magnesium ion-containing nonaqueous electrolytic solution having a high oxidation potential and capable of sufficiently bringing out excellent characteristics of metallic magnesium as a negative electrode active material and a method for manufacturing the same, and an electrochemical device with high performances using this electrolytic solution.

16 Claims, 6 Drawing Sheets

(51) Int. Cl.
  *H01M 6/04* (2006.01)
  *H01M 6/00* (2006.01)
  *H01M 10/00* (2006.01)
  *H01M 10/054* (2010.01)
  *H01M 10/0568* (2010.01)
  *H01M 10/0569* (2010.01)
  *H01M 4/46* (2006.01)

(56) References Cited

U.S. PATENT DOCUMENTS

| | | | |
|---|---|---|---|
| 5,491,039 A * | 2/1996 | Shackle | 429/307 |
| 2007/0172737 A1 | 7/2007 | Nakayama et al. | |
| 2008/0182176 A1* | 7/2008 | Aurbach et al. | 429/337 |
| 2009/0068568 A1 | 3/2009 | Yamamoto et al. | |
| 2009/0217979 A1 | 9/2009 | Yoneya et al. | |
| 2010/0196762 A1 | 8/2010 | Yamamoto et al. | |
| 2011/0171536 A1 | 7/2011 | Oki et al. | |
| 2011/0277832 A1 | 11/2011 | Shimizu et al. | |

FOREIGN PATENT DOCUMENTS

| | | |
|---|---|---|
| JP | 2003-512704 A | 4/2003 |
| JP | 2004-213991 A | 7/2004 |
| JP | 2004-259650 A | 9/2004 |
| JP | 2004-265677 A | 9/2004 |
| JP | 2005-228589 A | 8/2005 |
| JP | 2007-157416 A | 6/2007 |
| JP | 2007-188694 A | 7/2007 |
| JP | 2007-188709 * | 7/2007 ............ H01M 10/40 |

OTHER PUBLICATIONS

Amir et al., Progress in nonaqueous magnesium electrochemistry. J. Power Sources. Dec. 2007;174(2):1234-40.

Gregory, Thomas D. et al., "*Nonaqueous Electrochemistry of Magnesium*", J. Electrochem. Soc., vol. 137, No. 3, Mar. 1990, pp. 775-780.

Auerbach, D. et at., "*Prototype systems for rechargeable magnesium batteries*", Letters to Nature, vol. 407, Oct. 2000, pp. 724-727.

Gofer, Yosef, et al., "*Improved Electrolyte Solutions for Rechargeable Magnesium Batteries*", Electrochemical and Solid-State Letters, 9, (5), 2006, pp. A257-A260.

Gizbar, Haim et al., "Alkyl Group Transmetalation Reactions in Electrolytic Solutions Studied by Multinuclear NMR", Organometallics, vol. 23, No. 16, 2004, pp. 3826-3831.

* cited by examiner (a) COMPARATIVE EXAMPLE 1

(b) COMPARATIVE EXAMPLE 2

(a)

(b)

(a)

(b)

MAGNESIUM ION-CONTAINING NONAQUEOUS ELECTROLYTIC SOLUTION AND METHOD FOR MANUFACTURING THE SAME, AND ELECTROCHEMICAL DEVICE

TECHNICAL FIELD

The present invention relates to a magnesium ion-containing nonaqueous electrolytic solution displaying excellent electrochemical characteristics and a method for manufacturing the same, and to an electrochemical device using this electrolytic solution.

BACKGROUND ART

In recent years, in order to enhance convenience, small-sized electronic appliances have been miniaturized, reduced in weight and made portable. Following this, batteries to be used for these appliances are being demanded to realize miniaturization, weight reduction and slimness more and more from now on.

In comparing energy capacities per unit mass, an energy capacity of a single substance of lithium is large and excellent as compared with energy capacities of other metals. For that reason, there have hitherto been reported a number of studies regarding lithium secondary batteries. However, the lithium secondary batteries involve a problem in safety. Also, lithium is restricted in natural resources and is expensive.

On the other hand, magnesium is abundant in natural resources and much more inexpensive as compared with lithium. Also, metallic magnesium is relatively large in ionization tendency and large in quantity of electricity per unit volume capable of being extracted by an oxidation reduction reaction. Moreover, when used for batteries, high safety can be expected. Accordingly, the magnesium battery is a battery capable of compensating drawbacks of the lithium secondary battery. As seen in such an example, metallic magnesium and a magnesium ion are a very promising material as an electrode active material in electrochemical devices and a charge carrier in electrolytic solutions, respectively.

In designing an electrochemical device using metallic magnesium or a magnesium ion, selection of an electrolytic solution is extremely important. For example, as a solvent constituting the electrolytic solution, not only water or protonic solvents but aprotonic organic solvents such as esters, acrylonitrile or the like cannot be used. This is because when such a solvent is used, a passivation film which does not allow a magnesium ion to pass therethrough is formed on the surface of metallic magnesium. A problem of the formation of this passivation film is one of bars in putting a magnesium secondary battery into practical use.

As an electrolytic solution which is free from a problem of the formation of a passivation film and which is capable of electrochemically utilizing magnesium, ether solutions of a Grignard reagent (RMgX, wherein R is an alkyl group or an aryl group; and X is chlorine, bromine or iodine) have been known from of old. When such an electrolytic solution is used, metallic magnesium can be reversibly deposited and dissolved. However, there is involved a problem that an oxidation decomposition potential of the electrolytic solution is low as about +1.5 V relative to an equilibrium potential of metallic magnesium so that its potential window is insufficient for use in electrochemical devices (see the description of D. Aurbach, et al., Nature, 407, pages 724 to 727 (2000) (pages 724 to 726 and FIG. 3) as described later).

On the contrary, in 1990, Hoffman, et al. in The Dow Chemical Company found an ether solution of $Mg(ZR_4)_2$ (wherein Z is boron or aluminum; and R is a hydrocarbon group) as an electrolytic solution capable of electrochemically utilizing magnesium (see U.S. Pat. No. 4,894,302 (columns 1 to 10 and FIG. 1) and T. D. Gregory, et al., J. Electrochem. Soc., 137, pages 775 to 780 (1990) (pages 775 to 780, Table 3 and FIG. 6) as described later). Also, in 2000, Aurbach, et al., in Bar-Iran University found a tetrahydrofuran (THF) solution of $Mg(ZR_nX_{4-n})_2$ (wherein Z is born or aluminum; R is a hydrocarbon group; X is a halogen; and n is from 0 to 3) (see JP-T-2003-512704 (pages 12 to 19 and FIG. 3) and D. Aurbach, et al., Nature, 407, pages 724 to 727 (2000) (pages 724 to 726 and FIG. 3) as described later). Not only they performed deposition and dissolution of metallic magnesium, but they made a prototype of a magnesium secondary battery and successfully measured charge and discharge thereof.

On the other hand, JP-A-2004-259650 (pages 4 and 5 and FIG. 1) as described later reports that the problem of a low oxidation potential of an electrolytic solution can be solved by using an ether solution of an aromatic Grignard reagent RMgX wherein R is an aryl group (wherein X is chlorine or bromine).

DISCLOSURE OF THE INVENTION

However, all of the electrolytic solutions reported in U.S. Pat. No. 4,894,302 (columns 1 to 10 and FIG. 1) and JP-T-2003-512704 (pages 12 to 19 and FIG. 3) use instable raw materials and various solvents for the synthesis of an electrolytic solution, and the preparation steps are very complicated. Also, potential windows of the obtained electrolytic solutions were not sufficient as +2.0 V and +2.3 V, respectively relative to an equilibrium potential of metallic magnesium (see D. Aurbach, et al., Nature, 407, pages 724 to 727 (2000) (pages 724 to 726 and FIG. 3)).

Also, the present inventors replicated an experiment in detail regarding a THF solution having a concentration of 1.0 M of phenyl magnesium bromide $C_6H_5MgBr$, which had been described to have an oxidation potential of +3.8 V in JP-A-2004-259650 (pages 4 and 5 and FIG. 1). As a result, in fact, it has become clear that decomposition starts in the vicinity of +2.0 V (see COMPARATIVE EXAMPLE 1 and FIG. 3(a) as described later).

As described previously, the oxidation potential of magnesium electrolytic solutions which have been reported so far is about +2.3 V at maximum, and in electrochemical devices using the same, it is necessary to regulate an operating voltage at not more than 2.3 V. That is, in order to sufficiently bring out excellent performances of magnesium and realize an electrochemical device with a high energy density, it is necessary to develop an electrolytic solution having a larger oxidation potential.

In view of such circumstances, the present invention has been made, and its object is to provide a magnesium ion-containing nonaqueous electrolytic solution having a high oxidation potential and capable of sufficiently bringing out excellent characteristics of metallic magnesium as a negative electrode active material and a method for manufacturing the same, and an electrochemical device with high performances using this electrolytic solution.

In order to solve the foregoing problems, with respect to various magnesium ion-containing nonaqueous electrolytic solutions, the present inventors investigated the relationship between a complex structure and electrochemical characteristics in the electrolytic solution in detail. As a result, they have been able to clarify factors dominating various electrochemical characteristics including an oxidation potential of the electrolytic solution from the viewpoint of the complex structure, leading to accomplishment of the present invention.

That is, the present invention is concerned with a magnesium ion-containing nonaqueous electrolytic solution comprising a magnesium ion and another kind of a metal ion dissolved in an organic solvent, wherein a polynuclear complex ion having plural magnesium ions as a nucleus is contained;

the foregoing another kind of a metal ion forms at least two kinds of metal complexes; and the foregoing polynuclear complex ion and at least one of the foregoing at least two kinds of metal complexes have a ligand anion of the same kind.

Also, the present invention is concerned with a method for manufacturing a magnesium ion-containing nonaqueous electrolytic solution in which a magnesium ion and another kind of a metal ion are dissolved in an organic solvent;

a polynuclear complex ion having plural magnesium ions as a nucleus is contained;

the foregoing another kind of a metal ion forms at least two kinds of metal complexes; and the foregoing polynuclear complex ion and at least one of the foregoing at least two kinds of metal complexes have a ligand anion of the same kind, the method comprising mixing a single substance or compound of magnesium, an organometallic compound or salt containing the foregoing another kind of a metal ion and the foregoing organic solvent; and forming the foregoing polynuclear complex ion and the foregoing at least two kinds of metal complexes by a reaction after mixing.

Also, the present invention is concerned with an electrochemical device comprising a first electrode, a second electrode and the magnesium ion-containing nonaqueous electrolytic solution as set forth in any one of claims 1 to 13, wherein an active material of the foregoing second electrode is constituted so as to generate a magnesium ion upon being oxidized.

The magnesium ion-containing nonaqueous electrolytic solution of the present invention is an electrolytic solution in which a magnesium ion and another kind of a metal ion are dissolved in an organic solvent, wherein a polynuclear complex ions having plural magnesium ions as a nucleus is contained;

the foregoing another kind of a metal ion forms at least two kinds of metal complexes; and the foregoing polynuclear complex ion and at least one of the foregoing at least two kinds of metal complexes have a ligand anion of the same kind.

As a result of extensive and intensive investigations made by the present inventors, it has become clear that when an electrolytic solution having such a peculiar constitution is used, magnesium can be reversibly dissolved and deposited. Moreover, the foregoing polynuclear complex ion and at least one of the foregoing at least two kinds of metal complexes of the foregoing another kind of a metal ion have charges, and the charges are carried by the movement thereof. Therefore, conductivity of the foregoing magnesium ion-containing nonaqueous electrolytic solution is high. Also, by selecting a chemically stable substance as the foregoing polynuclear complex ion or the foregoing at least two kinds of metal complexes of the foregoing another kind of a metal ion, the oxidation potential of the foregoing magnesium ion-containing nonaqueous electrolytic solution can be kept high, and a magnesium ion-containing nonaqueous electrolytic solution having a large potential window can be realized.

Also, the method for manufacturing a magnesium ion-containing nonaqueous electrolytic solution of the present invention is a method for manufacturing the foregoing magnesium ion-containing nonaqueous electrolytic solution, wherein a single substance or compound of magnesium, an organometallic compound or salt containing the foregoing another kind of a metal ion and the foregoing organic solvent are mixed.

As a result of extensive and intensive investigations made by the present inventors, it has been discovered that when a magnesium salt such as magnesium(II) chloride or the like, or a Grignard reagent, which has hitherto been unable to be used as an electrolyte of magnesium batteries because it is insoluble in an organic solvent, is used upon being mixed with an organometallic compound or salt containing the foregoing another kind of a metal ion, the magnesium salt or Grignard reagent can be used as an electrolyte of magnesium batteries. This is because the foregoing polynuclear complex ion and the foregoing at least two kinds of metal complexes are generated by a reaction of the magnesium salt or Grignard reagent with the organometallic compound or salt containing the foregoing another kind of a metal ion.

According to this manufacturing method, the foregoing magnesium ion-containing nonaqueous electrolytic solution can be simply manufactured by using stable materials as starting raw materials. Therefore, the management of the raw materials is easy, and the manufacturing costs of the electrolytic solution can be largely reduced. Also, since optimal materials can be selected among wide-ranging materials, an oxidation potential of the foregoing magnesium ion-containing nonaqueous electrolytic solution can be kept high as far as possible.

Also, since the electrochemical device of the present invention uses the foregoing magnesium ion-containing nonaqueous electrolytic solution as an electrolytic solution, excellent characteristics of metallic magnesium as a negative electrode active material can be sufficiently brought out.

For example, in the case of constituting the foregoing electrochemical device as a magnesium battery, since the foregoing magnesium ion-containing nonaqueous electrolytic solution has a high oxidation potential, the foregoing electrolyte is neither oxidized nor decomposed due to a large electromotive force generated between the foregoing first electrode and the foregoing second electrode. Therefore, a battery with a large output voltage can be realized while applying a characteristic feature of magnesium which is a metal with a large ionization tendency. Also, in the case where a battery after discharge is charged and reused as a secondary battery, since the foregoing electrolyte has a high oxidation potential, the battery can be charged to a sufficiently charged state at a high charge voltage. Therefore, a large energy capacity of the magnesium battery can be sufficiently applied.

BEST MODES FOR CARRYING OUT THE INVENTION

Figure 1:
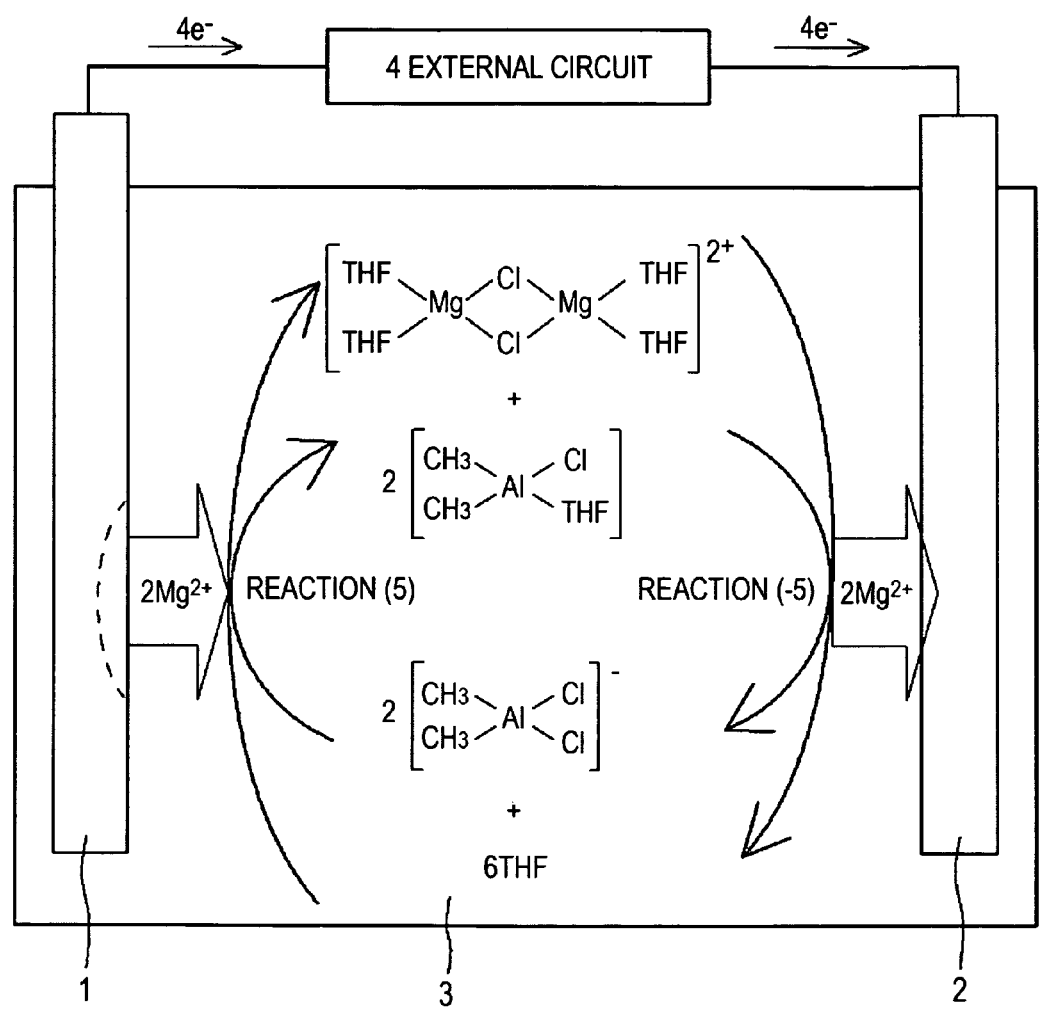
FIG. 1 is a diagrammatic explanatory view showing a constitution of a magnesium battery on the basis of an embodiment of the present invention.

In the magnesium ion-containing nonaqueous electrolytic solution of the present invention, it is desirable that in an electrode reaction to which a magnesium ion is related, transfer of the foregoing ligand anion of the same kind is conducted among the magnesium ion and the foregoing polynuclear complex ion and the foregoing two kinds of metal complexes. Specifically, the foregoing ligand anion of the same kind is a chloride ion, a bromide ion, an iodide ion or the like. As a result, the magnesium ion which has been generated by an electrode reaction on one of the electrodes is converted into the foregoing polynuclear complex ion in the vicinity of the one electrode and dissolved as the foregoing polynuclear complex ion in the foregoing magnesium ion-containing nonaqueous electrolytic solution, diffused and moved into the side of the other electrode in this electrolytic solution and then regenerated from the foregoing polynuclear complex ion in the vicinity of the other electrode, whereby it becomes possible to conduct an electrode reaction on the other electrode, and the foregoing magnesium ion-containing nonaqueous electrolytic solution capable of reversibly dissolving and depositing metallic magnesium is formed.

In the magnesium ion-containing nonaqueous electrolytic solution and the method for manufacturing the same according to the present invention, the foregoing polynuclear complex ion is desirably a binuclear complex ion having two magnesium ions as a nucleus. On that occasion, the foregoing binuclear complex ion is desirably any one of complex ions represented by the following general formulae (1) to (3).

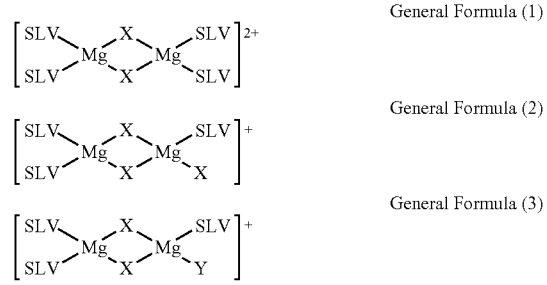

General Formula (1)

General Formula (2)

General Formula (3)

(In the formulae, X is any one of chlorine, bromine or iodine; SLV is a solvent molecule of the foregoing organic solvent; and Y$^-$ is a coexistent anion other than a halide ion.)

Since the foregoing binuclear complex has charges, it is able to give high conductivity to the electrolytic solution. Also, since R$^-$ (R is an alkyl group or an aryl group) is not contained, the foregoing binuclear complex is hardly subjected to oxidation and can keep the oxidation potential of the electrolytic solution high. Though the foregoing polynuclear complex ion is not always a binuclear complex, a binuclear complex is most easily generated in a usual magnesium ion concentration.

Also, the foregoing another kind of a metal ion is desirably a cation of an atom or atomic group selected from the group consisting of beryllium (Be), boron (B), aluminum (Al), gallium (Ga), indium (In), silicon (Si), tin (Sn), titanium (Ti), chromium (Cr), iron (Fe), cobalt (Co) and lanthanum (La); and is desirably introduced as an organometallic compound or salt with an atom, an organic group or an anion selected from the group consisting of hydrogen, an alkyl group, an alkenyl group, an aryl group, a benzyl group, an amide group, a fluoride ion (F$^-$), a chloride ion (Cl$^-$), a bromide ion (Br$^-$), an iodide ion (I$^-$), a perchloric acid ion (ClO$_4^-$), a tetrafluoroboric acid ion (BF$_4^-$), a hexafluorophosphoric acid ion (PF$_6^-$), a hexafluoroarsenic acid ion (AsF$_6^-$), a perfluoroalkylsulfonic acid ion (Rf1SO$_3^-$, wherein Rf1 is a perfluoroalkyl group) and a perfluoroalkylsulfonylimide ion (Rf2SO$_2$)$_2$ N$^-$, wherein Rf2 is a perfluoroalkyl group). In particular, it is desirable that the foregoing another kind of a metal ion is an aluminum ion, with the aluminum ion being introduced as an organometallic compound with a methyl group.

Also, it is desirable that the foregoing magnesium ion is introduced as a magnesium salt. On that occasion, the foregoing magnesium salt is desirably at least one salt selected from the group consisting of a chloride (MgCl$_2$), a bromide (MgBr$_2$), an iodide (MgI$_2$), a perchlorate (Mg(ClO$_4$)$_2$), a tetrafluoroborate (Mg(BF$_4$)$_2$)/a hexafluorophosphate (Mg(PF$_6$)$_2$), a hexafluoroarsenate (Mg(AsF$_6$)$_2$), a perfluoroalkylsulfonate (Mg(Rf1SO$_3$)$_2$, wherein Rf1 is a perfluoroalkyl group) and a perfluoroalkylsulfonylimide salt (Mg((Rf2SO$_2$)$_2$N)$_2$, wherein Rf2 is a perfluoroalkyl group). Also, it is desirable that the mass amount (by mole) of the salt other than the foregoing organometallic compound or magnesium salt is larger than the mass amount (by mole) of the foregoing magnesium salt.

Alternatively, it is desirable that the foregoing magnesium ion is introduced as a Grignard reagent RMgX (wherein R is an alkyl group or an aryl group; and X is X chlorine, bromine or iodine).

Alternatively, it is desirable that the forgoing magnesium ion is introduced by a reaction between metallic magnesium and an alkyl halide RX (wherein R is an alkyl group or an aryl group; and X is chlorine, bromine or iodine).

Also, it is desirable that a quaternary ammonium salt R$^1$R$^2$R$^3$R$^4$N$^+$Z$^-$ (in the formula, R$^1$, R$^2$, R$^3$ and R$^4$ are each an alkyl group or an aryl group; and Z$^-$ is a chloride ion (Cl$^-$), a bromide ion (Br$^-$), an iodide ion (I$^-$), an acetic acid ion (CH$_3$COO$^-$), a perchloric acid ion (ClO$_4^-$), a tetrafluoroboric acid ion (BF$_4^-$), a hexafluorophosphoric acid ion (PF$_6^-$), a hexafluoroarsenic acid ion (AsF$_6^-$), a perfluoroalkylsulfonic acid ion (Rf1SO$_3^-$, wherein Rf1 is a perfluoroalkyl group) or a perfluoroalkylsulfonylimide ion (Rf2SO$_2$)$_2$N$^-$, wherein Rf2 is a perfluoroalkyl group)) is contained. When a quaternary ammonium salt is added as a constitutional element in the foregoing electrolytic solution, it is possible to control electrochemical characteristics such as conductivity or the like.

Also, it is desirable that the foregoing organic solvent contains at least one kind of ether bond-containing organic compounds such as tetrahydrofuran (THF), diglyme or the like, or contains at least one kind of sulfide bond- or amide bond-containing organic compounds such as tetrafluorothiophene (THT) or the like. Such a solvent does not form a passivation film during dissolution and deposition of magnesium due to an electrode reaction and is able to dissolve the magnesium ion therein upon forming a coordination bond with the magnesium ion.

In the electrochemical device of the present invention, it is desirable that the foregoing active material of the foregoing second electrode is a metal single substance of magnesium or an alloy containing magnesium. In order to increase the energy capacity, it is desirable to use a pure metal for the negative electrode. On the other hand, for the purpose of enhancing the battery performances other than the energy capacity, for example, stabilization of the foregoing second electrode against repetition of charge and discharge or the like, it is also desirable to use an alloy.

Also, it is desirable that an active material of the foregoing first electrode is composed of a compound reactive with the foregoing magnesium ion or a compound capable of intercalating the foregoing magnesium ion.

Also, it is desirable that the electrochemical device of the present invention is constituted as a battery. Though the foregoing battery may be a primary battery to be discarded by only one-time use, it is preferably constituted as a chargeable secondary battery. In the foregoing secondary battery, when discharged by allowing a current to pass in the reverse direction to that in the case of discharge, the battery after the use can be returned in a state before the discharge, and therefore, it can be repeatedly used, thereby enabling resources to be effectively utilized. Since the electrochemical device of the present invention uses the electrolytic solution of the present invention having a large oxidation decomposition voltage, it is able to enhance the charge performance and optimal as a secondary battery.

As embodiments according to the present invention, an example in which the magnesium ion-containing nonaqueous electrolytic solution on the basis of the present invention is constituted in a manner as set forth in claims 7 to 9 and formed by the manufacturing method as set forth in claims 18 to 20; and an example of the electrochemical device as set forth in claims 7 to 9 in which this electrolytic solution is used for magnesium batteries are hereunder described with reference to the accompanying drawings.

FIG. 1 is a diagrammatic explanatory view showing a constitution of a magnesium battery 10 on the basis of the present embodiment. As shown in FIG. 1, the magnesium battery 10 is constituted of a negative electrode 1, a positive electrode 2 and an electrolyte 3 and connected to an external circuit 4. When the magnesium battery 10 is discharged, a load to be driven by the magnesium battery 10 is connected as the external circuit 4. Also, when the magnesium battery 10 is used as a secondary battery and charged, a power source for feeding a charge current to the magnesium battery 10 is connected as the external circuit 4.

The negative electrode 1 is, for example, metallic magnesium in a plate form. In order to increase the energy capacity of the negative electrode 1, it is desirable to use pure metallic magnesium. However, for the purpose of enhancing the battery performances other than the energy capacity, for example, stabilization of the negative electrode 1 against repetition of charge and discharge or the like, a magnesium alloy can also be used.

The positive electrode 2 is formed by press bonding a mixture of a positive electrode active material composed of, for example, graphite fluoride $((CF)_n)$, an oxide or halide of a metal element such as scandium (Sc), titanium (Ti), vanadium (V), chromium (Cr), manganese (Mn), iron (Fe), cobalt (Co), nickel (Ni), copper (Cu), zinc (Z) or the like, etc., a graphite powder or carbon fine particle as a conductive material and a polymer binder to a stainless steel-made positive electrode collector.

The electrolytic solution 3 is a magnesium ion-containing nonaqueous electrolytic solution on the basis of the present invention. An electrolytic solution in which the foregoing another kind of a metal ion is an aluminum ion, with the aluminum ion being introduced as dimethylaluminum chloride $((CH_3)_2AlCl)$ which is an organometallic compound with a methyl group; the foregoing magnesium ion is introduced as magnesium(II) chloride $(MgCl_2)$ which is a magnesium salt; and tetrahydrofuran (THF) is used as the foregoing organic solvent, is hereunder described.

It may be considered that in the electrolytic solution 3, the majority of dimethylchloroaluminum receives coordination of THF as a solvent molecule according to Reaction (1) expressed by the following reaction scheme and is dissolved as a complex molecule in THF.

Reaction (1)

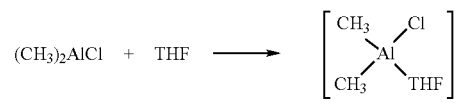

Also, it may be considered that a part of dimethylchloroaluminum works to abstract a chloride ion from magnesium (II) chloride according to Reaction (2) expressed by the following reaction scheme.

Reaction (2)

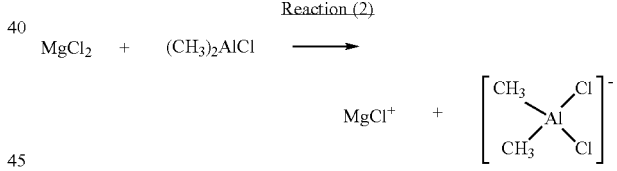

It may be considered that the resulting generated $MgCl^+$ is, for example, dimerized according to Reaction (3) expressed by the following reaction scheme and dissolved as a polynuclear complex ion in THF.

Reaction (3)

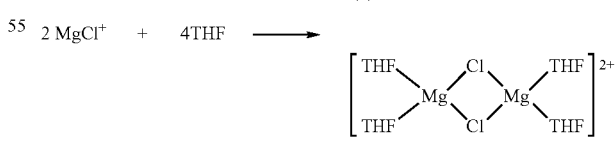

It may be considered that in the electrolytic solution in which tetrabutylaluminum chloride $((C_4H_9)_4NCl)$ or the like is added as the foregoing quaternary ammonium salt, since the concentration of the chloride ion becomes high, a polynuclear complex ion expressed by the following structural formula (1) is formed.

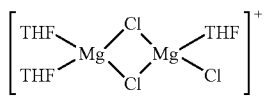

Structural Formula (1)

When the foregoing quaternary ammonium salt is added, the quaternary ammonium ion ($[N(C_4H_9)_4]^+$) is dissolved therein, whereby the ion concentration increases. Thus, there is brought an effect for enhancing the conductivity of the electrolytic solution 3.

There is thus formed the magnesium ion-containing nonaqueous electrolytic solution as set forth in claim 1, wherein
a polynuclear complex ion of a magnesium ion is contained;
an aluminum ion which is the foregoing another kind of a metal ion forms at least two kinds of metal complexes; and
the foregoing polynuclear complex ion and at least one of the foregoing two kinds of metal complexes have a ligand anion of the same kind (a chloride ion in this example).

This electrolytic solution 3 exhibits high performances as the magnesium ion-containing electrolytic solution as described below (in the electrolytic solution 3, exchange of the ligand is always conducted; and also, though it may be considered that complexes other than those described above are also present, the principal performances as the electrolytic solution are described in the foregoing constitution).

In the magnesium battery 10, at the time of discharge, metallic magnesium or its alloy as a negative electrode active material is oxidized in the negative electrode 1, thereby deintercalating electrons into the external circuit 4 according to Reaction (4) expressed by the following reaction scheme.

Negative electrode: $Mg \rightarrow Mg^{2+} + 2e^-$      Reaction (4)

As shown in FIG. 1, the generated magnesium ion receives a chloride ion which is the foregoing ligand anion of the same kind from an aluminum complex ion $[AlCl_2(CH_3)_2]^-$ in the vicinity of the negative electrode 1 and is converted into a polynuclear complex ion which is soluble in THF according to Reaction (5) expressed by the following reaction scheme.

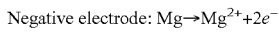

Reaction (5)

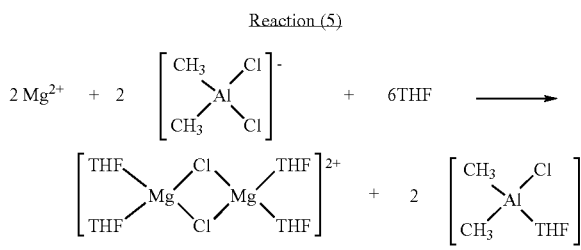

The polynuclear complex ion is dissolved in the electrolytic solution 3, diffused in the electrolytic solution 3 and moved to the side of the positive electrode 2.

The magnesium ion which has moved to the positive electrode 2 is captured on the surface of the oxide or halide as a positive electrode active material, or on the inner wall surface within avoid formed in the oxide or halide, and reacts with the positive electrode 2. At the same time, an element constituting the positive electrode active material is reduced, and electrons are taken from the external circuit 4 through the positive electrode collector or the like.

On that occasion, in order that the $Mg^{2+}$ ion may be able to easily invade the positive electrode active material, it is desirable that the $Mg^{2+}$ ion does not have a ligand and is in a non-bulky state. In the electrolytic solution 3 according to the present embodiment, as shown in FIG. 1, the magnesium ion which has been dissolved as a polynuclear complex ion in the electrolytic solution 3 is converted in the vicinity of the positive electrode 2 into an $Mg^{2+}$ ion capable of giving a chloride ion as the foregoing ligand anion of the same kind to an aluminum complex $[AlCl(CH_3)_2(THF)]$ and not having a ligand capable of invading the positive electrode active material according to Reaction (−5) expressed by the following reaction scheme. The Reaction (−5) is a reverse reaction of the Reaction (5).

Reaction (-5)

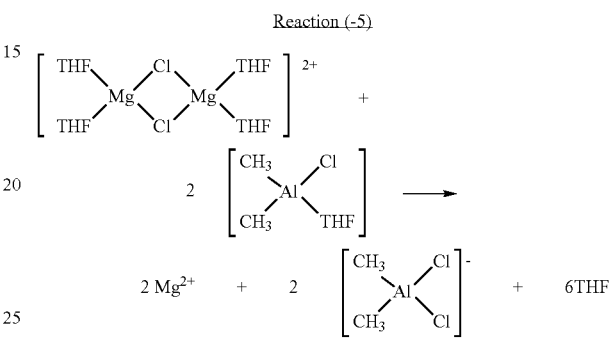

On the other hand, at the time of charge, the reaction proceeds in the reverse direction to the above. That is, $Mg^{2+}$ which has been taken into the positive electrode active material is converted into a polynuclear complex ion of a magnesium ion according to the Reaction (5) and deintercalated into the electrolytic solution 3. The polynuclear complex ion is diffused into the electrolytic solution 3 and moves to the side of the negative electrode 1. The polynuclear complex ion is returned to $Mg^{2+}$ in the vicinity of the negative electrode 1 according to the Reaction (−5) and reduced on the negative electrode 1 according to Reaction (−4) expressed by the following reaction scheme, whereby metallic magnesium is deposited on the negative electrode 1.

$Mg^{2+} + 2e^- \rightarrow Mg$      Reaction (−4)

As described previously, in the magnesium battery 10, in an electrode reaction to which the $Mg^{2+}$ ion is related, transfer of a chloride ion which is the foregoing ligand anion of the same kind is conducted among the $Mg^{2+}$ ion and its polynuclear complex ion and the two kinds of aluminum complexes according to the Reaction (5) and Reaction (−5). As a result, the electrolytic solution 3 capable of reversibly dissolving and depositing magnesium is formed. In this electrolytic solution 3, since a current is carried by the positive charge-bearing polynuclear complex ion and the negative charge-bearing $[AlCl_2(CH_3)_2]^-$, the conductivity of the electrolytic solution 3 is high. Also, the polynuclear complex ion and the two kinds of aluminum complexes contained in the electrolytic solution 3 are chemically stable, and thus, the oxidation potential of the electrolytic solution 3 is high.

EXAMPLES

EXAMPLES of the present invention are hereunder described, but it should be construed that the present invention is not limited to these EXAMPLES whatever.

In the present EXAMPLE, an example in which a magnesium ion-containing nonaqueous electrolytic solution described according to an embodiment was prepared, and the measurement of cyclic voltammetry (CV) of the electrolytic solution, the measurement of conductivity, the local structural analysis of a complex in the electrolytic solution by the X-ray absorption spectroscopy and the measurement of $^{27}$Al-NMR absorption were carried out is described.

<Preparation of Electrolytic Solution>

0.19 g of magnesium(II) chloride ($MgCl_2$) (manufactured by Aldrich), 0.37 mL of dimethylaluminum chloride (($CH_3$)$_2$AlCl) (manufactured by Aldrich) and 0.56 g of tetrabutylammonium chloride (($C_4H_9$)$_4$NCl) (manufactured by Fluka) were added to tetrahydrofuran (THF, manufactured by Tomiyama Pure Chemical Industries, Ltd.) so as to have a magnesium ion concentration of 0.25 moles/L, and the mixture was stirred at 60° C. for 2 days, thereby preparing an electrolytic solution of EXAMPLE.

Figure 3:
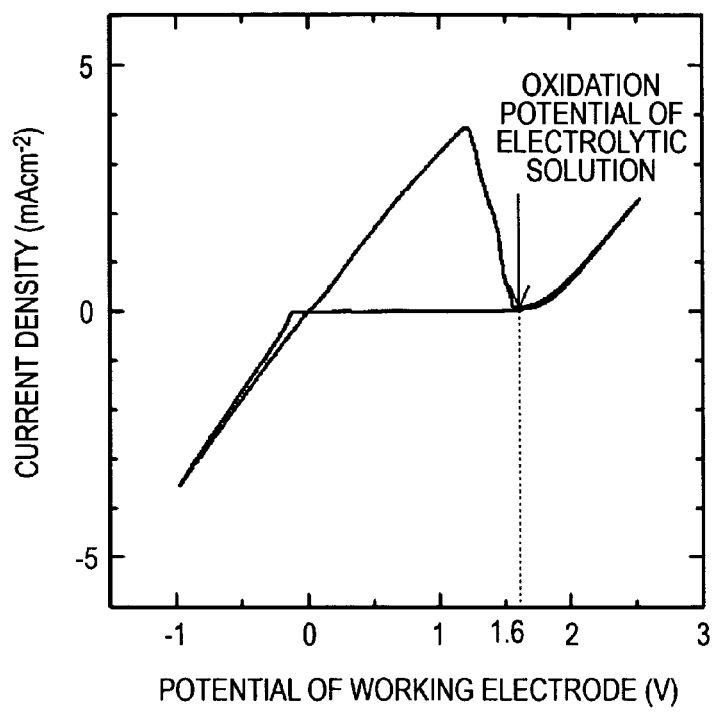
FIG. 3 is a graph showing the results of measurement of cyclic voltammetry (CV) of each of electrolytic solutions of COMPARATIVE EXAMPLE 1 and COMPARATIVE EXAMPLE 2 of the present invention.
Figure 3:
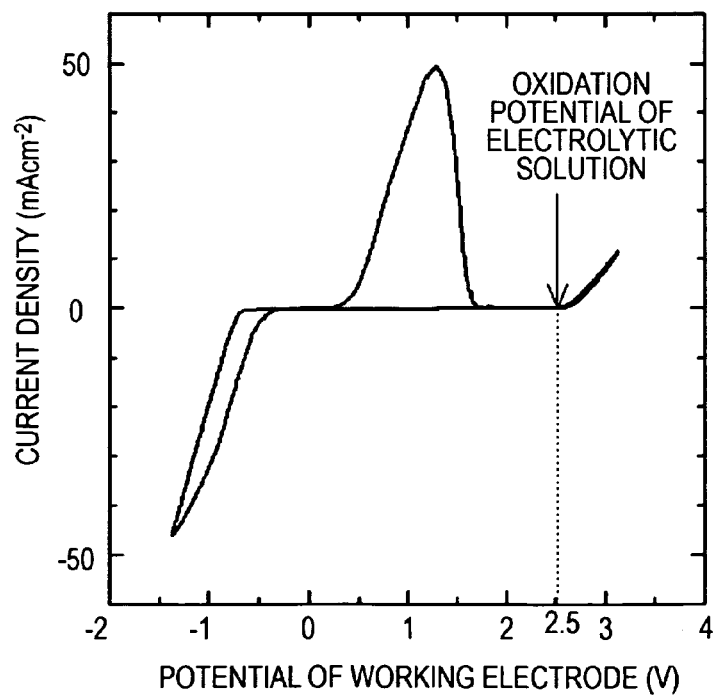

On the other hand, as an electrolytic solution of COMPARATIVE EXAMPLE 1, a THF solution of $C_4H_9MgCl$ as a commercially available Grignard regent was prepared so as to have a magnesium ion concentration of 0.25 moles/L. Also, as an electrolytic solution of COMPARATIVE EXAMPLE 2, a THF solution of $Mg(AlCl_2(C_2H_5)(C_4H_9))_2$ was prepared so as to have a magnesium ion concentration of 0.25 moles/L by the method disclosed in JP-T-2003-512704 (pages 12 to 19 and FIG. 3) and D. Aurbach, et al., Nature, 407, pages 724 to 727 (2000) (pages 724 to 726 and FIG. 3).

<Measurement of Cyclic Voltammetry (CV) of Electrolytic Solution>

In order to examine electrochemical characteristics of each of the prepared electrolytic solutions, the cyclic voltammetry (CV) of the electrolytic solution was measured. For the measurement, a three-electrode type cell (amount of electrolytic solution: 1 mL) was used; a platinum (Pt) electrode (diameter: 1.6 mm, manufactured by BAS Inc.) was used as a working electrode; and a magnesium (Mg) wire (diameter: 1.6 mm, manufactured by The Nilaco Corporation) was used for each of a counter electrode and a reference electrode. The measurement was carried out at room temperature while stirring the electrolytic solution at 300 rpm by using a stirrer made of Teflon (registered trademark).

The measurement of one cycle was carried out by starting from a state of open circuit voltage (OCV) and changing the potential of the working electrode relative to the potential of the reference electrode in the order of OCV→about −1.5 V→about +3.75 V→OCV such that it was first decreased to about −1.5 V toward the reduction side, subsequently increased to about +3.75 V toward the oxidation side and finally returned to OCV. A sweep rate of potential was regulated at 5 mV/s.

Figure 2:
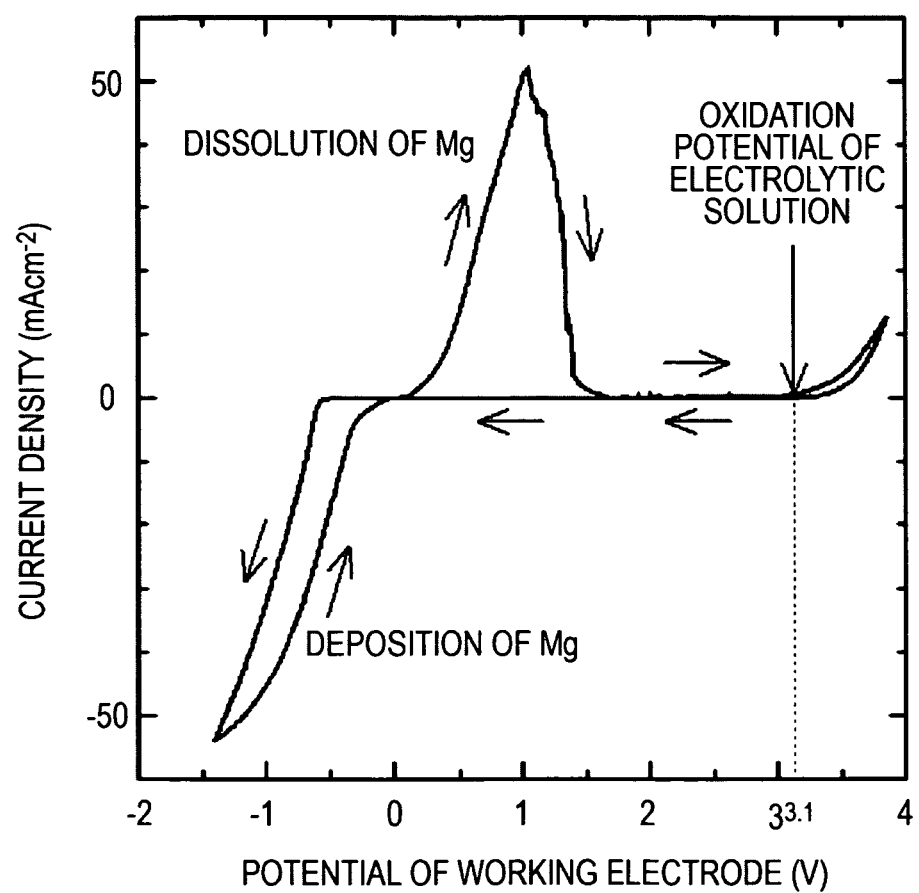
FIG. 2 is a graph showing the results of measurement of cyclic voltammetry (CV) of an electrolytic solution of EXAMPLE of the present invention.

FIG. 2 is a graph showing the results of CV measurement of the electrolytic solution of EXAMPLE. The abscissa represents a potential of the working electrode relative to the reference electrode (hereinafter the same). FIG. 3(a) and FIG. 3(b) are graphs showing the results of CV measurement of the electrolytic solution of COMPARATIVE EXAMPLE 1 and the electrolytic solution of COMPARATIVE EXAMPLE 2, respectively. In all of the electrolytic solutions, a current accompanying on the deposition and dissolution of magnesium is observed, and it is noted that an electrolytic solution capable of reversibly depositing and dissolving Mg was formed.

On the other hand, a current density was set up at +50 μA/cm$^2$, and an oxidation potential at which each of the electrolytic solutions started the oxidation decomposition was examined. As a result, in the electrolytic solution of EXAMPLE, in the case where the potential of the working electrode was higher than the potential of the magnesium reference electrode by +3.1 V or more, the oxidation decomposition occurred. On the contrary, in the electrolytic solution of COMPARATIVE EXAMPLE 1, in the case where the potential of the working electrode was higher than the potential of the magnesium reference electrode by +1.6 V or more, the oxidation decomposition occurred; and in the electrolytic solution of COMPARATIVE EXAMPLE 2, in the case where the potential of the working electrode was higher than the potential of the magnesium reference electrode by +2.5 V or more, the oxidation decomposition occurred.

The measured values +1.6 V and +2.5 V of the oxidation potentials of the electrolytic solution of COMPARATIVE EXAMPLE 1 and the electrolytic solution of COMPARATIVE EXAMPLE 2 are high by about +0.1 V, respectively, as compared with the oxidation potentials +1.5 V and +2.3 V reported in D. Aurbach, et al., Nature, 407, pages 724 to 727 (2000) (pages 724 to 726 and FIG. 3). However, it may be considered that this was caused in view of the fact that the oxidation potential was taken when the current density reached +50 μA/cm$^2$ but not when it rose up. When this point is taken into consideration, the two measurement results are well coincident with each other. On the contrary, the oxidation potential of the electrolytic solution of EXAMPLE is +3.1 V, a value of which is remarkably excellent as compared with the oxidation potential of the conventional electrolytic solution. It may be considered that when the potential of the working electrode exceeds +3.1 V, oxidation of the aluminum complex [AlCl(CH$_3$)$_2$(THF)] or [AlCl$_2$(CH$_3$)$_2$]$^−$ occurs, and therefore, a reason why the electrolytic solution with a high oxidation potential was obtained resides in the fact that dimethylaluminum chloride ((CH$_3$)$_2$AlCl) capable of forming stable complexes [AlCl(CH$_3$)$_2$(THF)] and [AlCl$_2$(CH$_3$)$_2$]$^−$ was used as the foregoing organometallic compound.

<Measurement of Conductivity>

In order to examine the conductivity of the electrolytic solution, the measurement of complex impedance was carried out at room temperature by using a two-electrode cell (stainless steel-made electrodes, diameter: 10 mm, distance between the electrodes: 10 mm). As a result of comparison of the conductivity of the electrolytic solution at 100 kHz, it was 3.8 mS/cm in the electrolytic solution of EXAMPLE, whereas it was 0.039 mS/cm in the electrolytic solution of COMPARATIVE EXAMPLE 1 and 1.8 mS/cm in the electrolytic solution of COMPARATIVE EXAMPLE 2, respectively.

The reason why the conductivity of the electrolytic solution of EXAMPLE is high resides in the fact that the current is carried by the positive charge-bearing polynuclear complex ion and the negative charge-bearing [AlCl$_2$(CH$_3$)$_2$]. On the contrary, it may be considered that the reason why the conductivity of the electrolytic solution of COMPARATIVE EXAMPLE 1 is extremely low resides in the fact that only a slight amount of the charge-bearing complex is contained in the THF solution having the Grignard reagent C$_4$H$_9$MgCl singly dissolved therein (see the consideration regarding COMPARATIVE EXAMPLE 1 as described later).

<Local Structural Analysis of Complex in Electrolytic Solution by X-Ray Absorption Spectroscopy>

In order to clarify the complex structure of a magnesium ion and an aluminum ion in the electrolytic solution of EXAMPLE, a local structural analysis using the X-ray absorption spectroscopy was carried out.

When an atom or ion of an element which is an object to the X-ray absorption spectral measurement absorbs X-rays, an inner-shell electron is excited. When the inner-shell electron absorbs a photon (X-ray) having energy equal to or higher than ionization energy, the inner-shell electron is deintercalated as a photoelectron. The X-ray absorption spectrum observed at that time is composed of an absorption edge (characteristic absorption edge) which sharply rises up and a continuous spectrum continuing therefrom toward the high energy side.

The energy of the characteristic absorption edge is determined by an energy level of the inner-shell electron and is inherent to the element which is an object to the measurement but is not substantially influenced by a substance in which an atom or ion of that element is present. On the other hand, an absorption coefficient μ in the continuous spectrum continuing toward the high energy side merely decreases in a monotone in the case where the atom or ion is isolated. However, in the case where other atoms or ions are present in the surroundings, an X-ray absorption fine structure (XAFS) appears. This XAFS reflects the local structure in the surroundings of that element. This is because a deintercalated photoelectron is subjected to scattering by other atoms in the surroundings, and as a result, the XAFS appears due to modulation of the transition moment. Different from the X-ray diffraction, the XAFS can be observed even when the measurement object does not have a periodical structure. In consequence, the XAFS can be used for determining structural parameters in a liquid or amorphous material, for example, a distance to the adjacent atom, a coordination number or the like.

Details of the measurement method or analysis method of XAFS are described in documents (for example, *X-Ray Absorption Fine Structure*, edited by Yasuo Udagawa and published by Japan Science Societies Press; *X-Ray Absorption Spectroscopy*, edited by Toshiaki Ohta and published by Industrial Publishing & Consulting, Inc.; or the like). Here, the main points of the analysis method are described below.

First of all, among the surveyed absorption coefficients μ of continuous spectrum, a background portion μs which varies in a monotone is eliminated. Subsequently, a vibrational structure χ(k) of XAFS as standardized below is determined by dividing by a smooth absorption coefficient μ0 from which a vibrational structure of the characteristic absorption edge has been eliminated.

$$\chi(k) = (\mu(k) - \mu s(k))/\mu 0(k)$$

Here, k represents a wave number of photoelectron. By changing the order and conducting the standardization in advance, the background portion can be subsequently eliminated, too. In the present EXAMPLE, the analysis was conducted by the latter order.

Subsequently, a Fourier transform of the vibrational structure χ(k) is conducted, thereby determining a radial distribution function ρ(r). On that occasion, χ(k) becomes small with an increase of the wave number. Thus, in order to compensate such a reduction, in general, kχ(k) to k³χ(k) weighed with k to k³, respectively are subjected to a Fourier transform in place of χ(k). The radial distribution function ρ(r) is a function reflecting the local structure such as the coordination number or kind of the adjacent atom or the like while defining the distance r from the element which is an object to the measurement as a variable.

Figure 4:
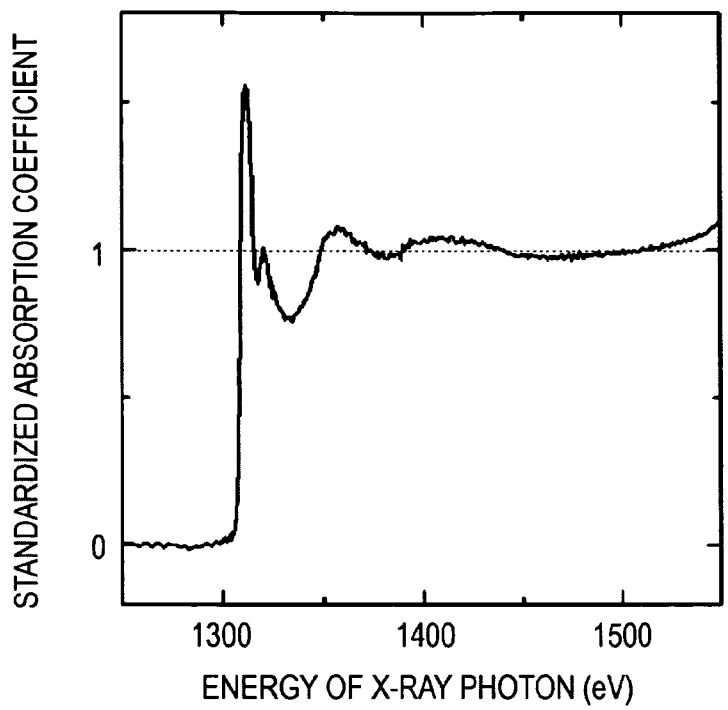
FIG. 4(a) is an XAFS spectrum in the vicinity of a K-shell absorption edge of Mg displayed by an electrolytic solution of EXAMPLE of the present invention.
FIG. 4(b) shows a radial structure function in the surroundings of an Mg atom.
Figure 4:
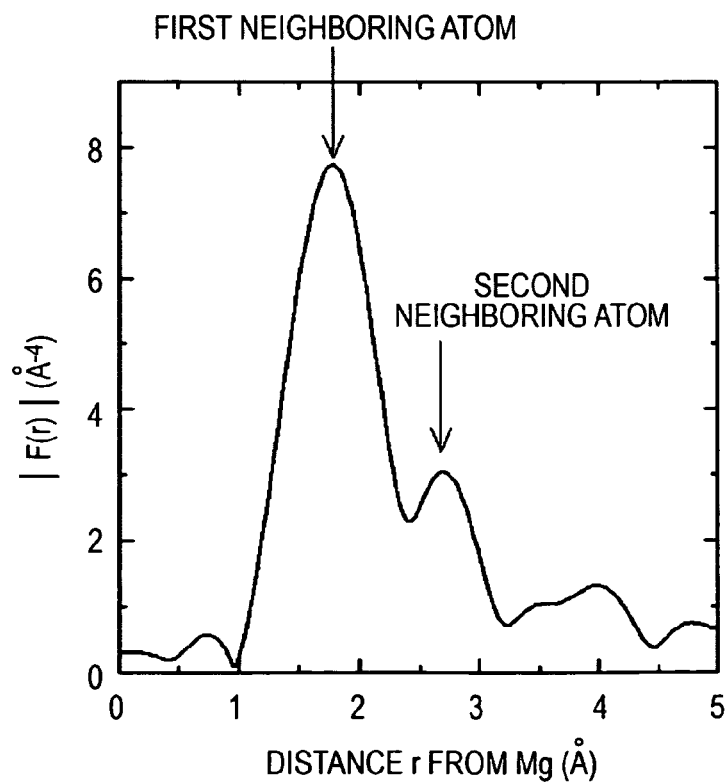

FIG. 4(a) is an X-ray absorption spectrum in the K absorption edge of magnesium in the electrolytic solution obtained in EXAMPLE. This spectrum is standardized such that an absorption coefficient before the K absorption is 0 and that an absorption coefficient in the amplitude center of the vibrational structure in the continuous spectrum continuing toward the side of high energy from the K absorption edge is 1. The vibrational structure χ(k) is obtained from this spectrum by subtracting 1 in the continuous spectrum continuing toward the side of high energy from the K absorption edge.

Figure 5:
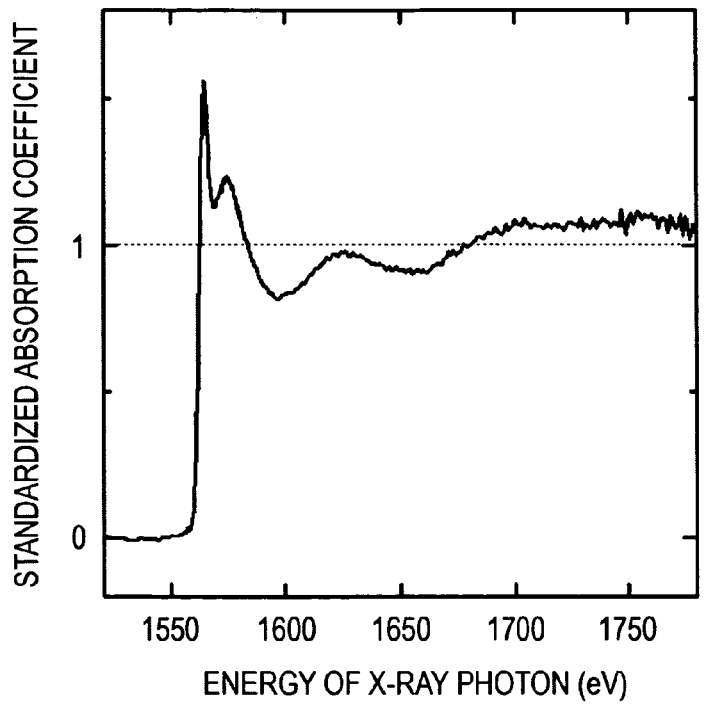
FIG. 5(a) is an XAFS spectrum in the vicinity of a K-shell absorption edge of Al displayed by an electrolytic solution of EXAMPLE of the present invention.
FIG. 5(b) shows a radial structure function in the surroundings of an Al atom.
Figure 5:
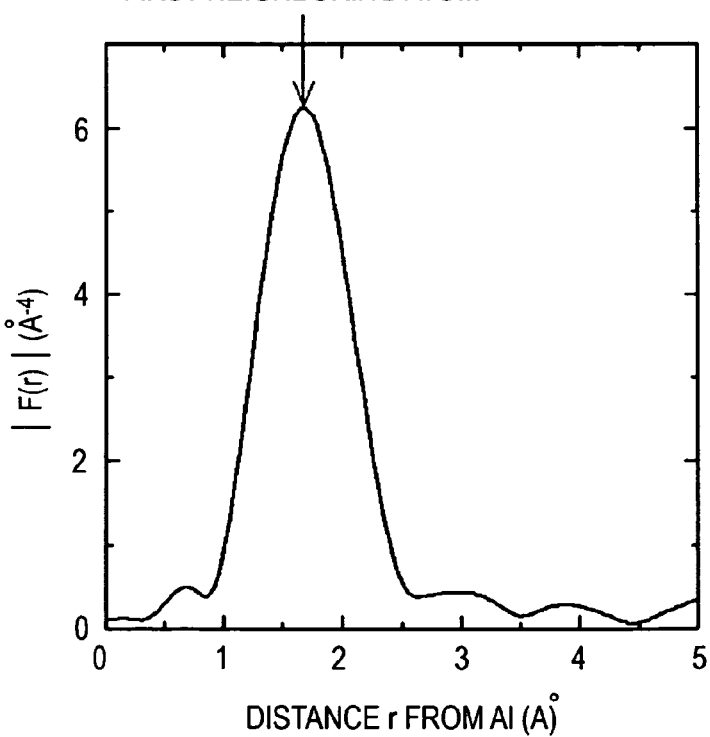

FIG. 4(b) shows the results obtained by subjecting k³χ(k) to a Fourier transform, taking absolute values of the real part and the imaginary part and determining a radial distribution function ρ(r) in the real space. As shown in FIG. 5(b), in the electrolytic solution of EXAMPLE, the radial distribution function ρ(r) in the surroundings centering on the Mg²⁺ ion displayed distribution having a first peak at a position away from the center by about 1.7 angstroms. It may be considered that this is a peak derived from the most neighboring atom (or ion) to the foregoing Mg²⁺ ion. Its intensity reflects the coordination number of the foregoing Mg²⁺ ion, and so far as the Mg²⁺ ion is similar to a usual Mg²⁺ ion, it is corresponding to a coordination number of 4.

The radial distribution function ρ(r) displayed a second peak at a position away from the center by about 2.7 angstroms and displayed a third peak at a position away from the center by from 3.4 to 4.3 angstroms. These peaks can be easily explained so far as it is considered that the Mg²⁺ ion, for example, forms a polynuclear complex represented by the following structural formula (2).

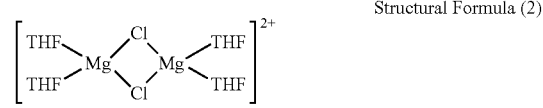

Structural Formula (2)

That is, it may be considered that the second peak is assigned to other Mg²⁺ ion contained in the polynuclear complex and that the third peak is assigned to a ligand bonding to this Mg²⁺ ion. On the other hand, when the radial distribution function ρ(r) of an aluminum ion as described below is made by reference, it may be considered that it is impossible to explain the presence of the second and third peaks without admitting the fact that the Mg²⁺ ion forms a polynuclear complex.

In view of the facts that the anion ligand contained in the electrolytic solution of EXAMPLE is only a chloride ion and that a possibility that THF coordinates on the two Mg²⁺ ions is low from the standpoints of a binding power and a stereochemical factor, it is undoubted that in the polynuclear complex, the ligand which coordinates on the two Mg²⁺ ions and bridges the both is a chloride ion. Up to date, any knowledge other than this has not been obtained for restricting the structure of the polynuclear complex, and the present invention does not particularly restrict the structure of the polynuclear complex other than this. However, a possibility that the polynuclear complex is a binuclear complex represented by the structural formula (2) or structural formula (1). This is because in the case where the Mg²⁺ ion concentration is not extremely large, and the Mg²⁺ ion forms a complex having a coordination number of 4, such structures area structure with the highest possibility for realization, and reports regarding Grignard reagents as described later support this fact.

FIG. 5(a) and FIG. 5(b) are an X-ray absorption spectrum in the K absorption edge of aluminum in the electrolytic solution of EXAMPLE and a radial distribution function ρ(r) in the surroundings centering of an aluminum ion, as determined in the same manner as in the case of magnesium. Similar to the spectrum in FIG. 4(a), the spectrum in FIG. 5(a) is standardized such that an absorption coefficient before the K absorption edge is 0 and that an absorption coefficient in the amplitude center of a vibrational structure in a continuous spectrum continuing toward the side of high energy from the K absorption edge is 1.

As shown in FIG. 5(b), in the electrolytic solution of EXAMPLE, a radial distribution function ρ(r) centering on the aluminum ion merely displays one peak at a position away from the center by about 1.7 angstroms as a significant peak.

This demonstrates that structural ordering is present only in the most neighboring atom (or ion) to the aluminum ion and that structural ordering is not present in any other site. In consequence, it may be considered that the aluminum ion forms a mononuclear complex.

<Measurement of $^{27}$Al-NMR Absorption>

In order to examine the structure of the aluminum complex in the electrolytic solution in more detail, the measurement of $^{27}$Al-NMR absorption was conducted at room temperature. For the measurement, JNM-AL400, manufactured by JEOL Ltd. was used, and 0.04 moles/L of an Al $(NO_3)_3$ aqueous solution was used as a standard sample.

Figure 6:
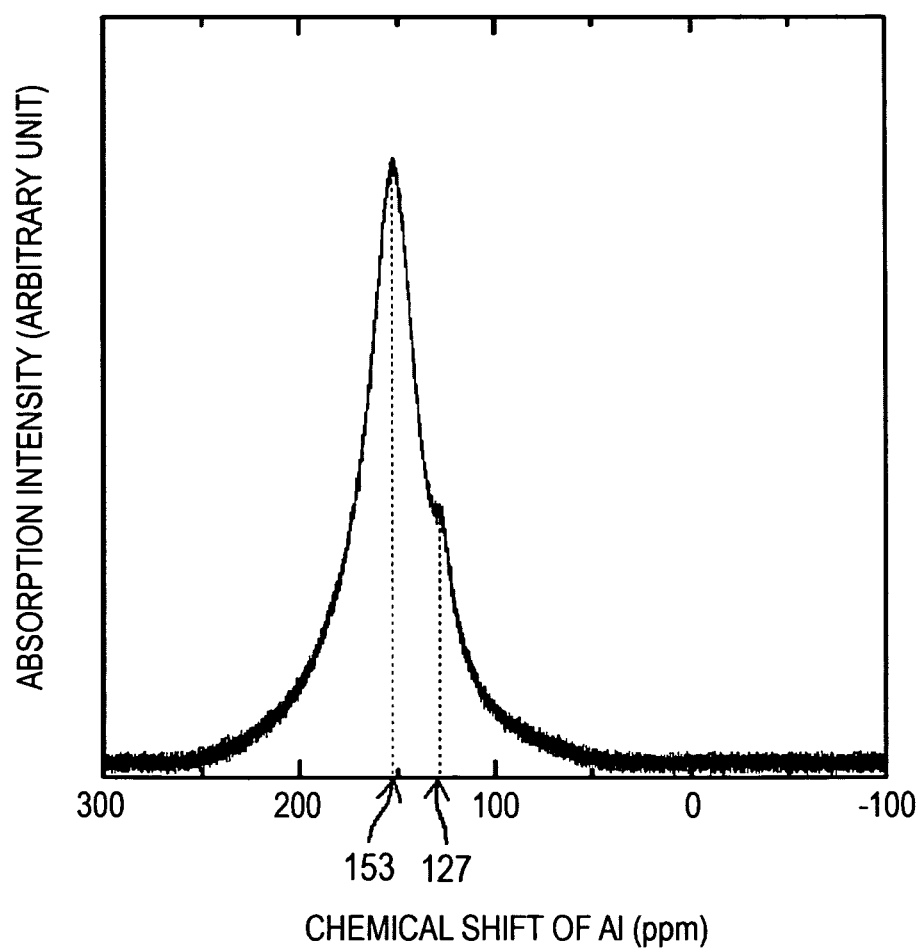
FIG. 6 is an $^{27}$Al-NMR spectrum displayed by an electrolytic solution of EXAMPLE of the present invention.

FIG. 6 is an $^{27}$Al-NMR spectrum of an electrolytic solution of EXAMPLE. As shown in FIG. 6, a broad spectrum in which a chemical shift had a peak in the vicinity of 153 ppm, and a spectrum in which a chemical shift had a peak in the vicinity of 127 ppm were observed.

Of these, the NMR spectrum having a peak in the vicinity of 153 ppm is assigned to $[AlCl(CH_3)_2(THF)]$ (chemical shift: 157 ppm) and $[AlCl_2(CH_3)_2]$ (chemical shift: 151 ppm). The peak in the vicinity of 127 ppm is assigned to $[AlCl_3(CH_3)]^-$. Besides, though $[Al(CH_3)_3(THF)]$ (chemical shift: 177 ppm) is also present, it may be considered that $[AlCl(CH_3)_2(THF)]$ and $[AlCl_2(CH_3)_2]^-$ chiefly work in the electrolytic solution 3.

As an example in which a complex structure of a magnesium ion in a solution analogous to the electrolytic solution of COMPARATIVE EXAMPLE 1 was analyzed, there is a report regarding a dibutyl ether $(C_4H_9OC_4H_9)$ solution of each of $CH_3MgBr$ and $C_2H_5MgBr$ (see I. Abraham, et al., *Polyhedron*, 15, 3993 (1996)). According to this report, the magnesium ion in the dibutyl ether solution forms a binuclear complex (dimer) in which two $Mg^{2+}$s form a nucleus, and a ligand bonds to each of the $Mg^{2+}$s in a tetrahedral arrangement. Assuming that the magnesium ion in the electrolytic solution of COMPARATIVE EXAMPLE 1 takes the same structure, a binuclear complex (dimer) represented by the following structural formula (3) will be formed.

Structural Formula (3)

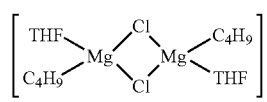

Since the foregoing binuclear complex does not have charges, it is assumed that the electrolytic solution of COMPARATIVE EXAMPLE 1 is not conductive, or its conductivity is extremely low. The results of the measurement of conductivity of the electrolytic solution of COMPARATIVE EXAMPLE 1 support this assumption, and in the electrolytic solution of COMPARATIVE EXAMPLE 1, a possibility that the Grignard reagent is dissolved as the binuclear complex (dimer) represented by the structural formula 2 therein is high. Though this electrolytic solution contains the binuclear complex of an $Mg^{2+}$ ion, it is poor in conductivity and low in oxidation potential, and thus, it is essentially different from the polynuclear complex of an $Mg^{2+}$ ion, an aspect of which is a characteristic feature of the present invention. This is because the electrolytic solution of COMPARATIVE EXAMPLE 1 does not contain the foregoing another kind of an ion, and the foregoing binuclear complex is not subjected to modification due to a reaction with the foregoing another kind of an ion.

The magnesium ion-containing nonaqueous electrolytic solution of the present invention can also be formed from a commercially available Grignard reagent RMgX. In fact, the electrolytic solution formed of a magnesium salt and an organometallic compound of another kind of a metal ion ($MgCl_2$ and $2AlClR_2$) and the electrolytic solution formed of a Grignard reagent, an organometallic compound of another kind of a metal ion and a salt ($RMgCl+R_3Al+AlCl_3$) displayed the same characteristics. In that case, the binuclear complex composed of a dimer of the Grignard compound loses $R^-$ due to a reaction with another kind of a metal ion and is modified into the binuclear complex represented by any one of the general formulae (1) to (3). Such a binuclear complex has charges, and therefore, it is able to give high conductivity to the electrolytic solution. Also, since $R^-$ is eliminated, such a binuclear complex is hardly subjected to oxidation and is able to keep the oxidation potential of the electrolytic solution high.

Also, as an example in which a complex structure in a solution formed by the same method as in the electrolytic solution of COMPARATIVE EXAMPLE 2, which is analogous to the electrolytic solution of COMPARATIVE EXAMPLE 2, was analyzed, there is a report that a magnesium ion is present as a complex ion of mononuclear hexa-coordination $[MgCl(THF)_5]^+$ and that an aluminum ion is present as a polynuclear complex ion crosslinked with a chloride ion $[(C_2H_5)_2ClAl—Cl—AlCl(C_2H_5)_2]^-$ (see H. Gizbar, et al., *Organometallics*, 23, 3826 (2004)).

Also, in another report, the same writers mention that as to the same electrolytic solution, the magnesium ion is present as two kinds of hexa-coordinated mononuclear complexes $[MgCl(THF)_5]^+$ and $[MgCl_2(THF)_4]$ and one kind of a polynuclear complex $[Mg_2Cl_3(THF)_3]^+$ and that the aluminum ion is present as two kinds of mononuclear complexes $[AlCl(C_2H_5)_2(THF)]$ and $[AlCl_2(C_2H_5)_2]^-$ (see Y. Gofer, et al., *Electrochem. Solid-State Lett.*, 9, A257 (2006)). However, any specific ground for demonstrating that the polynuclear complex of a magnesium ion is present is not elucidated. In the light of the above, the structure of the complex contained in the electrolytic solution of COMPARATIVE EXAMPLE 2 is often unclear, and the relationship with the electrolytic solution of the present invention is unclear, too.

As described previously, it is shown that the magnesium ion-containing nonaqueous electrolytic solution of EXAMPLE is an electrolytic solution containing a polynuclear complex of an $Mg^{2+}$ ion and also containing at least two kinds of aluminum complexes as the metal complex of another kind of a metal ion and is explicitly the electrolytic solution which meets the requirements of claim 1.

Here, in the electrode reaction to which the $Mg^{2+}$ ion is related, the roles of the two kinds of aluminum complexes are to conduct transfer of a chloride ion which is the ligand anion by the Reaction (5) and Reaction (−5) between an $Mg^{2+}$ ion and its polynuclear complex ion, to make it possible to achieve dissolution and deposition of the magnesium ion and to keep electrical neutrality as the whole system containing an Mg complex. In consequence, any complex can be used likewise the aluminum complex so far as it is a complex capable of bearing these roles similar to the aluminum complex.

The magnesium ion-containing nonaqueous electrolytic solution of the present EXAMPLE has a high oxidation potential and a large potential window as compared with the conventional electrolytic solutions. That is, by using this electrolytic solution, it becomes possible to drive an electrochemical device at a higher operating voltage. Also, this electrolytic solution has a high conductivity as compared with the conventional electrolytic solutions. As a result, when this electrolytic solution is used, an internal resistance of the electrochemical device is low, and it is possible to realize more excellent load characteristics. That is, the magnesium electrolytic solution of the present EXAMPLE is able to significantly enhance characteristics of an electrochemical device.

Also, the manufacturing method of a magnesium ion-containing nonaqueous electrolytic solution of the present EXAMPLE is simple and easy as compared with the conventional methods because the solvent itself of the electrolytic solution is used for the synthesis. Also, the management of raw materials is easy because metallic magnesium or the magnesium salt and other stable materials are used as the starting raw materials. That is, there is a possibility that in putting an electrolytic solution as a product into practical use, the manufacturing costs can be greatly reduced.

While the present invention has been described with reference to the embodiments and working examples, it is possible to variously modify the foregoing examples on the basis of the technical thoughts of the present invention.

For example, in the electrochemical device on the basis of the present invention which is suitable as a primary or secondary battery, its shape, constitution and materials and so on can be properly selected so far as they do not deviate from the present invention.

INDUSTRIAL APPLICABILITY

The electrochemical device according to the present invention provides a magnesium battery having a constitution capable of sufficiently bringing out excellent characteristics as a negative electrode active material, which polyvalent metals such as metallic magnesium or the like, for example, a large energy capacity, etc., contributes to realization of miniaturization, weight reduction and portability in small-sized electronic appliances and contributes to an enhancement of convenience and a reduction of costs.

The invention claimed is:

1. A magnesium ion-containing nonaqueous electrolytic solution comprising a magnesium ion and another kind of a metal ion dissolved in an organic solvent, wherein the magnesium ion-containing non aqueous electrolytic solution comprises a polynuclear complex ion having a nucleus including a plurality of magnesium ions, the complex ion represented by either of the following general formulae (1) or (2):

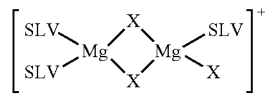

General Formula (1)

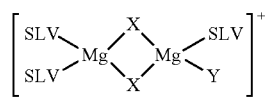

General Formula (2)

wherein X is any one of chlorine, bromine or iodine; SLV is a solvent molecule of the organic solvent; and Y$^-$ is a coexistent anion other than a halide ion;

the other kind of a metal ion forms at least two different kinds of metal complexes, a first metal complex having at least a methyl functional group, a solvent molecule of the organic solvent and a halogen, and a second metal complex having at least a methyl functional group and a halogen; and the polynuclear complex ion and at least one of the at least two kinds of metal complexes have a ligand anion of the same kind.

2. The magnesium ion-containing nonaqueous electrolytic solution according to claim 1, wherein in an electrode reaction to which a magnesium ion is related, transfer of the ligand anion of the same kind is conducted among the magnesium ion and the polynuclear complex ion and the two kinds of metal complexes.

3. The magnesium ion-containing nonaqueous electrolytic solution according to claim 1, wherein the other kind of a metal ion is a cation of an atom selected from the group consisting of beryllium (Be), boron (B), aluminum (Al), gallium (Ga), indium (In), silicon (Si), tin (Sn), titanium (Ti), chromium (Cr), iron (Fe), cobalt (Co) and lanthanum (La).

4. The magnesium ion-containing nonaqueous electrolytic solution according to claim 3, wherein the other kind of a metal ion is introduced as an organometallic compound or salt with an atom, an organic group or an anion selected from the group consisting of hydrogen, an alkyl group, an alkenyl group, an aryl group, a benzyl group, an amide group, a fluoride ion (F$^-$), a chloride ion (Cl$^-$), a bromide ion (Br$^-$), an iodide ion (I$^-$), a perchloric acid ion (ClO$_4^-$), a tetrafluoroboric acid ion (BF$_4^-$), a hexafluorophosphoric acid ion (PF$_6^-$), a hexafluoroarsenic acid ion (AsF$_6^-$), a perfluoroalkylsulfonic acid ion (Rf1SO$_3^-$, wherein Rf1 is a perfluoroalkyl group) and a perfluoroalkylsulfonylimide ion (Rf2SO$_2$)$_2$N$^-$, wherein Rf2 is a perfluoroalkyl group).

5. The magnesium ion-containing nonaqueous electrolytic solution according to claim 4, wherein the other kind of a metal ion is an aluminum ion, with the aluminum ion being introduced as an organometallic compound with a methyl group.

6. The magnesium ion-containing nonaqueous electrolytic solution according to claim 1, wherein the magnesium ion is introduced as a magnesium salt.

7. The magnesium ion-containing nonaqueous electrolytic solution according to claim 6, wherein the magnesium salt is at least one salt selected from the group consisting of a chloride (MgCl$_2$), a bromide (MgBr$_2$), an iodide (MgI$_2$), a perchlorate (Mg(ClO$_4$)$_2$), a tetrafluoroborate (Mg(BF$_4$)$_2$), a hexafluorophosphate (Mg(PF$_6$)$_2$), a hexafluoroarsenate (Mg(AsF$_6$)$_2$), a perfluoroalkylsulfonate (Mg(Rf1SO$_3$)$_2$, wherein Rf1 is a perfluoroalkyl group) and a perfluoroalkylsulfonylimide salt (Mg((Rf2SO$_2$)$_2$N)$_2$, wherein Rf2 is a perfluoroalkyl group).

8. The magnesium ion-containing nonaqueous electrolytic solution according to claim 1, wherein the magnesium ion is introduced as a Grignard reagent RMgX (wherein R is an alkyl group or an aryl group; and X is X chlorine, bromine or iodine).

9. The magnesium ion-containing nonaqueous electrolytic solution according to claim 1, wherein the magnesium ion is introduced by a reaction between metallic magnesium and an alkyl halide RX (wherein R is an alkyl group or an aryl group; and X is chlorine, bromine or iodine).

10. The magnesium ion-containing nonaqueous electrolytic solution according to claim 1, containing a quaternary ammonium salt R$^1$R$^2$R$^3$R$^4$N$^+$Z$^-$ wherein R$^1$, R$^2$, R$^3$ and R$^4$ are each selected group a group consisting of an alkyl group or an aryl group; and Z$^-$ is selected from a group consisting of a chloride ion (cl$^-$), a bromide ion (Br$^-$), an iodide ion (I$^-$), an acetic acid ion (CH$_3$COO$^-$), a perchloric acid ion (ClO$_4^-$), a tetrafluoroboric acid ion (BF$_4^-$), a hexafluorophosphoric acid ion (PF$_6^-$), a hexafluoroarsenic acid ion (AsF$_6^-$), a perfluoroalkylsulfonic acid ion (Rf1SO$_3^-$, wherein Rf1 is a perfluoroalkyl group) or a perfluoroalkylsulfonylimide ion $(Rf2SO_2)_2 N^-$, wherein Rf2 is a perfluoroalkyl group.

11. The magnesium ion-containing nonaqueous electrolytic solution according to claim 1, wherein the organic solvent contains at least one kind of ether bond-containing organic compounds or contains at least one kind of sulfide bond- or amide bond-containing organic compounds.

12. An electrochemical device comprising a first electrode, a second electrode and the magnesium ion-containing nonaqueous electrolytic solution according to any one of claims 1 to 11, wherein an active material of the second electrode is constituted so as to generate a magnesium ion upon being oxidized.

13. The electrochemical device according to claim 12, wherein the active material of the second electrode is a single substance of magnesium or an alloy containing magnesium.

14. The electrochemical device according to claim 12, wherein an active material of the first electrode is composed of a compound reactive with the magnesium ion or a compound capable of intercalating the magnesium ion.

15. The electrochemical device according to claim 12, which is constituted as a battery.

16. The electrochemical device according to claim 15, which is constituted as a chargeable secondary battery by a reverse reaction.

* * * * *